(12) United States Patent
Weatherby et al.

(10) Patent No.: US 6,302,061 B1
(45) Date of Patent: Oct. 16, 2001

(54) INSTANTANEOUSLY EXPANDIBLE AND COLLAPSIBLE PET CARRIER

(75) Inventors: John Weatherby, 521 Richwood Rd., Mullica Hills, NJ (US) 08062; Mabel Hinds, Cherry Hill, NJ (US)

(73) Assignee: John Weatherby, Mullica Hill, NJ (US)

( * ) Notice: Subject to any disclaimer, the term of this patent is extended or adjusted under 35 U.S.C. 154(b) by 0 days.

(21) Appl. No.: 09/507,661

(22) Filed: Feb. 22, 2000

(51) Int. Cl.[7] .................................................... A01K 1/03
(52) U.S. Cl. ............................ 119/498; D30/109; 119/482
(58) Field of Search .................................... 119/498, 482; D30/109

(56) References Cited

U.S. PATENT DOCUMENTS

| | | | |
|---|---|---|---|
| 4,073,021 | * | 2/1978 | Carlisle ..................................... 5/365 |
| 4,484,540 | * | 11/1984 | Yamamoto .............................. 119/19 |
| 4,784,382 | * | 11/1988 | Myers .................................... 272/25 |
| 5,054,426 | | 10/1991 | Panarelli ................................ 119/17 |
| 5,558,041 | * | 9/1996 | Fairall, Jr. et al. ................... 119/165 |
| 5,671,697 | | 9/1997 | Rutman ................................ 119/473 |
| 5,960,744 | * | 10/1999 | Rutman ................................ 119/473 |
| 6,076,485 | * | 6/2000 | Peeples et al. ........................ 119/497 |

* cited by examiner

Primary Examiner—Charles T. Jordan
Assistant Examiner—Kimberly Smith
(74) Attorney, Agent, or Firm—Stuart M. Goldstein

(57) ABSTRACT

The present invention consists of a pet carrier with two compartments. The first compartment, in which the pet is placed, consists only of side walls and a bottom. The second compartment consists only of side walls and a top. The second compartment is configured to be placed, in telescopic fashion, directly over the first compartment. In this manner, the second compartment moves up and down in a vertical plane from a lowered position in which it substantially covers the first compartment, representing the smaller or collapsed configuration of the carrier, to a raised position over the first compartment, representing the carrier's larger or expanded configuration. The two compartments are locked in the raised and lowered positions by manually operated spring snap locks. Releasing the snap locks simply and instantaneously allows the carrier to be collapsed or expanded.

6 Claims, 1 Drawing Sheet

INSTANTANEOUSLY EXPANDIBLE AND COLLAPSIBLE PET CARRIER

BACKGROUND OF THE INVENTION

Containers for transporting animals, and particularly smaller pets like cats and dogs, are wellknown and are commonly used. The most common "pet carrier" is usually an enclosure with appropriate vent holes which is suitable for housing the pet. In most cases, such a carrier is small and restrictive. It fails to allow the animal much space. Of course when transporting a pet, a larger container may not be practical. First, it may be difficult to carry a large container. Second, buses, trains, airplanes, or similar common carriers may require that the size of pet containers be limited. Thus, even if a larger spaced pet container is available for moving the container manually or transporting it in a private car while enroute to, for example, a train station or an airport, the requirements of the common carrier may not permit such a container.

Attempts have been made to employ pet carriers which are capable of expanding. Examples are such carriers are shown in U.S. Pat. Nos. 5,054,426 and 5,671,697. However, these and similar carriers do not provide that much additional space for the pet. Most significantly, it is a time consuming and cumbersome process to change the configuration of these carriers. In addition, none of the carriers contemplate allowing a change in their respective configurations while the pet remains in the carrier. Consequently, when there is an immediate need to collapse a carrier which contains a pet, for example at an airport or train station, or to place the carrier under a seat, the pet must first be removed and then secured in a controlled situation. The carrier must then be manually adjusted to change its size. Only after this is done can the pet be returned to the carrier. It can be appreciated that removing an active pet from its carrier in a public area, for any amount of time, will present problems. This situation becomes even more difficult if only one person is involved in removing the pet, controlling the pet, configuring the carrier, and then returning the pet. The present invention provides a solution to these problems.

SUMMARY OF INVENTION

It is thus an object of the present invention to provide a pet carrier which overcomes the limitations and disadvantages of prior devices.

It is an object of the present invention to provide a pet carrier which can simply and instantaneously be expanded and collapsed.

It is a further object of the present invention to provide a pet carrier which affords to the pet an extra measure of space while it is in the carrier, but permits the user to simply and instantaneously collapse the carrier when such is required.

It is another object of the present invention to provide a pet carrier which permits the user to simply and instantaneously collapse or expand the carrier while the pet is in the carrier.

It is still another object of the present invention to provide a pet carrier which permits a single user to simply and instantaneously collapse or expand the carrier while the pet is in the carrier.

It is a further object of the present invention to provide a pet carrier which allows for ease of transporting a carrier in a variety of environments which require that the carrier size be changed periodically.

It is another object of the present invention to provide a pet carrier which can be collapsed for ease of storage when not in use.

A these and other objects are accomplished by the present pet carrier invention which comprises two compartments. The first compartment, in which the pet is placed, consists only of side walls and a bottom. The second compartment consists only of side walls and a top. The second compartment is configured to be placed, in telescopic fashion, directly over the first compartment. In this manner, the second compartment moves up and down in a vertical plane from a lowered position in which it substantially covers the first compartment, representing the smaller or collapsed configuration of the carrier, to a raised position over the first compartment, representing the carrier'larger or expanded configuration. The two compartments are locked in the raised and lowered positions by manually operated spring snap locks. Releasing the snap locks simply and instantaneously allows the carrier to be collapsed or expanded.

The novel features which are considered as being characteristic of the invention are set forth in particular in the appended claims. The pet carrier itself, however, both as to its design, construction, and use, together with additional features and advantages thereof, are best understood upon a review of the following detailed description with reference to the accompanying drawings.

DETAILED DESCRIPTION OF THE INVENTION

Figure 1:
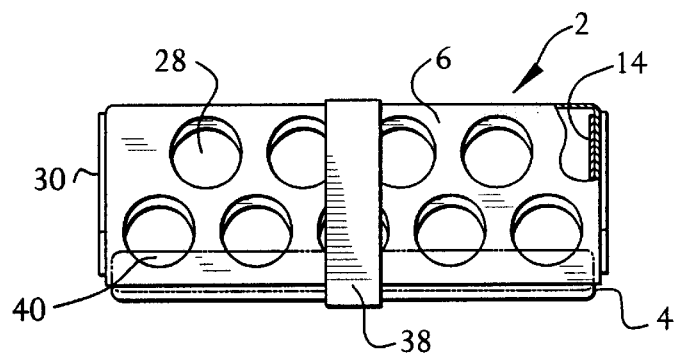
FIG. 1 is a side view of the pet carrier of the present invention in its collapsed position with a partial broken away view.

Pet carrier 2 of the present invention comprises first compartment 4 and second compartment 6. First compartment 4 consists of side walls 8, 10, 12, and 14 and bottom floor 16. First compartment 4 does not have a top; the top is open. Second compartment 6 has side walls 18, 20, 22, 24, and top 26. Second compartment 6 does not have a bottom; the bottom is open. Vent holes 28 are located on the side walls of compartments 4 and 6.

Figure 3:
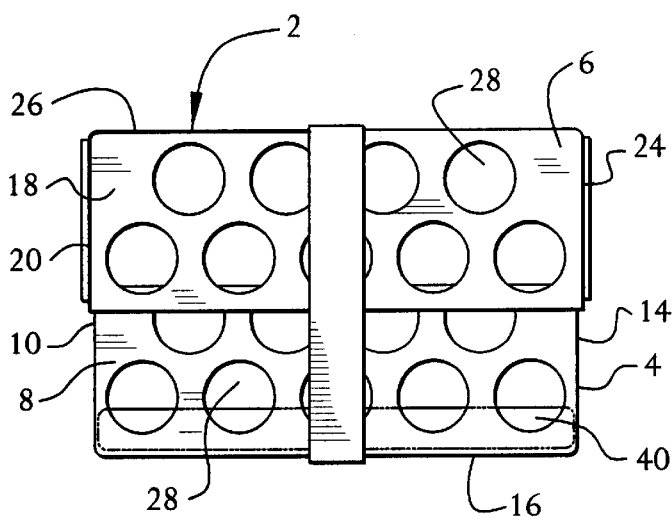
FIG. 3 is a side view of the pet carrier of the present invention in its expanded position.

Second compartment 6 is slightly larger than first compartment 4 and is thus configured to be directly and telescopically placed over compartment 4. In this configuration, second compartment 6 can move up and down in a vertical plane from a lowered or collapsed position in which it substantially covers first compartment 4, as shown in FIG. 1, to a raised or expanded position over first compartment 4, as shown in FIG. 3. Vent holes 28 in first compartment 4 and second compartment 6 are corresponding, so that when carrier 2 is in its collapsed position, shown in FIG. 1, the vent holes are in alignment.

Figure 2:
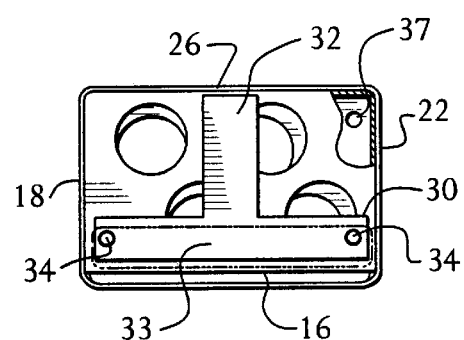
FIG. 2 is an end view of the pet carrier of the present invention in its collapsed position with a partial broken away view.
Figure 4:
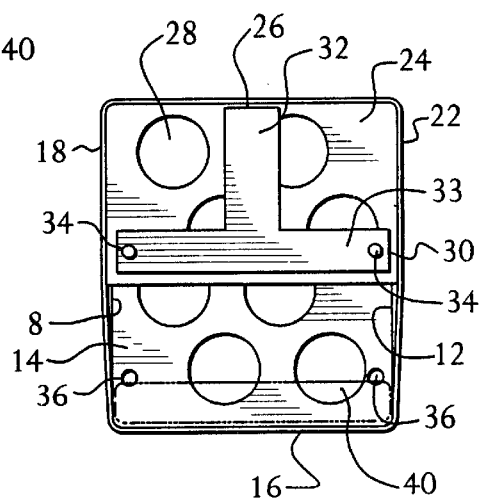
FIG. 4 is an end side view of the pet carrier of the present invention in its expanded position.

Biased spring snap locks 30 are located on side walls 20 and 24 of second compartment 6. Each spring snap lock 30 comprises a main biased upper body section 32 and lower body section 33. Lower body section 33 comprises two tabs 34. Two lower tab openings 36 and two upper tab openings 37 in each of side walls 10 and 14 of first compartment 4 correspond to tabs 34. Lower tab openings 36 in side wall 14 of first compartment 4 are shown in FIG. 4. One of the two upper tab openings 37 in side wall 14 is shown cut-away in FIG. 2. Identical tab openings for insertion of tabs 34 are located in side wall 10.

It thus can be seen that when pet carrier 2 is in the collapsed position, shown in FIG. 1, tabs 34 are located in tab openings 36, thereby locking the carrier in the collapsed position. When it is necessary to place carrier 2 in its expanded position shown in FIG. 3, lower body section 33 of biased spring snap locks 30 on either side of the carrier are simply pulled slightly outward. This disengages tabs 34 from tab openings 36, allowing second compartment 6 to be moved up over first compartment 4. When tabs 34 are in alignment with corresponding upper tab openings 37 in first compartment 4, biased spring snap locks 30 are then released, which compels tabs 34 into these upper tab openings, thereby locking carrier 2 in the expanded position.

Thus, this invention provides a pet carrier 2 which is easy and convenient to use and which instantaneously, upon simple movement of the snap locks, can easily be expanded and collapsed by one person. Significantly, such can be accomplished without removing the pet from the carrier.

Additional features contemplated by the invention include the use of strap 38, which serves to maintain carrier 2 in its expanded and collapsed positions and provides a means of carriage. It is also contemplated that pad 40 can be positioned within first compartment 4 for pet comfort. If constructed of buoyant material, pad 40 can also be used as a flotation device.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

What is claimed:

1. An instantaneously expandible and collapsible pet carrier comprising:
   a. first compartment means for the placement and transportation of a pet, said first compartment means comprising a space defined only by a floor member and side wall members;
   b. second compartment means positioned telescopically and directly overlaying said first compartment means, said second compartment means comprising a space defined only by a top member and side wall members and being moveable within a vertical plane between a collapsed position in which the second compartment means substantially covers the first compartment means and an expanded position, in which the second compartment means is raised in a position over the first compartment means, whereby the first and second compartment means are configured so that a pet can be housed and transported in the carrier both while it is in the collapsed position and the expanded position; and
   c. locking release means for securing said first and second compartment means in the collapsed and expanded positions and for permitting instantaneous movement of the compartments between the two positions, said locking release means comprising biased spring snap locks located on the side wall members of the second compartment means, the snap locks being configured to be operably moveable to lock the carrier in either of the two positions.

2. The pet carrier as in claim 1 in which a strap means surrounds both compartment means for maintaining the compartment means in either of the two positions.

3. The pet carrier as in claim 1 in which a strap means surrounds both compartment means for sporting the carrier.

4. The pet carrier as in claim 1 further comprising a floatation pad placed within the first compartment means.

5. The pet carrier as in claim 1 which the side wall members further comprise vent holes.

6. An instantaneously expandible and collapsible pet carrier comprising:
   a. first compartment means for the placement and transportation of a pet, said first compartment means comprising a space defined only by a floor member and side wall members;
   b. second compartment means positioned telescopically and directly overlaying said first compartment means, said second compartment means comprising a space defined only by a top member and side wall members and being moveable within a vertical plane between a collapsed position in which the second compartment means substantially covers the first compartment means and an expanded position, in which the second compartment means is raised in a position over the first compartment means, whereby the first and second compartment means are configured so that a pet can be housed and transported in the carrier both while it is in the collapsed position and the expanded position;
   c. locking release means for securing said first and second compartment means in the collapsed and expanded positions and for permitting instantaneous movement of the compartments between the two positions; and
   d. strap means surrounding both compartment means for maintaining the compartment means in a collapsed position for the transporting of a pet, said strap means also maintaining the compartment means in an expanded position for the transporting of a pet.

* * * * *